United States Patent [19]
Lachut

[11] 3,871,432
[45] Mar. 18, 1975

[54] ALL GLASS REINFORCED TIRE CONSTRUCTION

[75] Inventor: Frank J. Lachut, Cumberland, R.I.

[73] Assignee: Owens-Corning Fiberglas Corporation, Toledo, Ohio

[22] Filed: May 7, 1973

[21] Appl. No.: 357,731

Related U.S. Application Data

[63] Continuation of Ser. No. 235,228, March 16, 1972, abandoned.

[52] U.S. Cl. ................................. 152/354, 152/360
[51] Int. Cl. ............................................... B60c 9/12
[58] Field of Search ........... 152/330, 354, 355, 356, 152/357, 359, 360, 361 R

[56] References Cited
UNITED STATES PATENTS

| | | | |
|---|---|---|---|
| 3,115,179 | 12/1963 | Shepherd | 152/354 |
| 3,299,934 | 1/1967 | Pace | 152/354 |
| 3,538,974 | 11/1970 | Marzocchi | 152/354 |
| 3,570,573 | 3/1971 | Marker | 152/359 |
| 3,606,921 | 9/1971 | Grawey | 152/354 |
| 3,772,130 | 11/1973 | Marzocchi | 152/355 |

*Primary Examiner*—M. Henson Wood, Jr.
*Assistant Examiner*—Robert Saifer
*Attorney, Agent, or Firm*—Carl G. Staelin; Raul F. Stutz; John W. Overman

[57] ABSTRACT

A tire construction featuring a carcass composed off radially disposed cords, each composed of a multiplicity of continuous glass filaments, a pair of tread reinforcing belts featuring parallel cords of glass, each composed of a multiplicity of glass filaments, and, in combination therewith, a liner ply extending from bead to bead on the innerside of said carcass, said liner ply containing a minor amount of chopped lengths of glass and a squeegee or cushion ply containing a minor amount of chopped lengths of glass interposed between the liner ply and the radial cord carcass ply in the tread region extending from one shoulder to the opposite shoulder.

21 Claims, 1 Drawing Figure

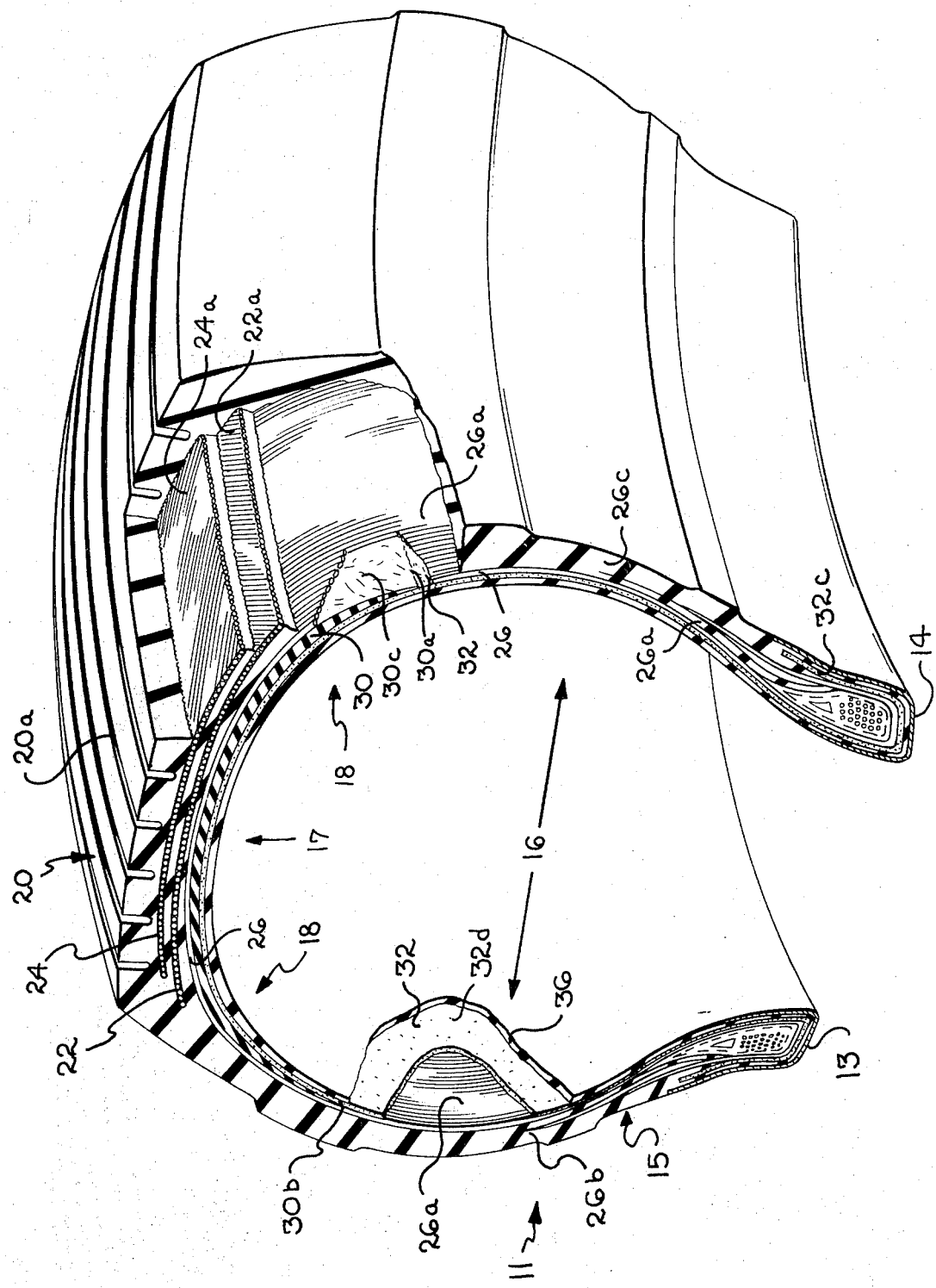

ALL GLASS REINFORCED TIRE CONSTRUCTION

This is a continuation of application Ser. No. 235,228, filed Mar. 16, 1972, now abandoned.

The present invention relates to a tire construction and particularly to a tire construction featuring substantially exclusively glass as a reinforcement. At the outset, of course, it is to be understood that the use of the phrase "substantially exclusively glass as a reinforcement" is not meant to exclude the presence of conventional rubber reinforcement, such as carbon black and the like.

Historically, of course, textiles have been employed as reinforcement for tires. Metal in the form of wires, strands and cords has also been employed, principally by European manufacturers. More recently, glass in the form of strands, yarns and cords has been employed. Generally speaking, by reinforcement in this sense is meant carcass reinforcement in the form of one or a plurality of superimposed plies or as tread reinforcement in the form of peripherally positioned belts or breaker strips.

A more detailed historical description of the use of natural and organic cord fabrics, metal and glass is contained in U.S. Pat. Nos. 3,315,722 and 3,311,152.

The recognition of glass as a desirable tire reinforcement, of course, is one thing. The actual utilization of glass as a reinforcement, on the other hand, is something else. Thus, while glass possesses a number of physical properties which are academically interesting, the successful utilization of glass in the form of filaments, strands, yarns and cords, either in continuous or short lengths, is a matter which requires considerable intelligent ingenuity and development in order to arrive at tire constructions which are reflective of the desirable inherent properties of glass. Looked at in another way, glass is also inherently possessed of properties which make the successful utilization thereof in whatever form not easily accomplished. By way of example, of course, the glass surface, being smooth and hydrophilic, is not readily incorporated into rubber stock in a manner as can be satisfactorily assimilated in a manner as permits efficient reinforcement. The many problems attendant the successful marriage of the glass surface and the surrounding rubber matrix are overcome by the application of technology described and claimed in U.S. Pat. No. 3,252,278 assigned to the same assignee as the present application. U.S. Pat. No. 3,391,052 assigned to the assignee of the present application likewise concerns itself with the successful incorporation of glass into a rubber matrix. Over and above the surface problem, there exists the necessity of considering and determining the particular form of the glass for the particular stress area and the particular spatial or geometric pattern of disposition of the glass in the particular form in a particular location within the tire structure in order to achieve a tire exhibiting performance and as well, and perhaps more importantly, acceptance.

In this regard, domestic tire manufacturers have over the years been faced with the dilemna inherent in two different basic tire structures. The conventional U.S. tire embodies bias construction wherein the cords of the carcass ply define a path in proceeding from one bead to the other which is angular or, in other words, at an inclination to the peripheral centerline or central tread groove. On the other hand, many nondomestic, particularly European, tire manufacturers feature radial cord carcass reinforcement wherein the cords proceed in the shortest possible path from one bead to the other directly across the crown and thus normal or perpendicular to the peripheral centerline, e.g., central tread groove. With either of these types of carcass constructions, tread reinforcing belts and/or breaker strips can be employed, although less so in the conventional bias type tire. Each of these tires have their desirable attributes. Bias tires mounted on cars tend to impart a more comfortable ride while at the same time being less stable, as it were, under rolling conditions; such being particularly imminent when cornering at high speeds annd under wet or snowy pavement conditions. The European radial tire, on the other hand, tends to be more stable under these same conditions, while unfortunately such tires are attendant by a certain harshness or hardness of ride. This latter characteristic has not been enthusiastically accepted by domestic car buyers. Some have said that harshness of ride is an inescapable accompaniment to the employment of metal wire and/or glass cord reinforcement. This view is perhaps based upon a consideration of the basic wire or glass filament as, in effect, a column which, of course, it is in fact, considered strictly from the standpoint of physics. Thus, one considering a wire or glass fiber in comparison to a nylon or a polyester fiber could arrive at the conclusion that the nylon and the polyester, being organic, would be more flexible, less columnlike, more resilient, more cushionable, etc.

The last several years has seen the emergence of a tire referred to as a belted bias tire. These tires usually feature a carcass composed of organic cords, usually rayon, nylon or polyester, of bias inclination and tread reinforcing belts. Probably the most popular version has employed tread reinforcing belt plies featuring glass cords.

With the foregoing introduction, it is a general object of the present invention to provide a tire which embodies a combination of remarkable rolling stability together with the important characteristics of soft ride.

It is a significant object of the present invention to provide a tire which features glass as substantially the sole reinforcement; the glass reinforcement being so composed and so arranged that the tire embodying same is possessed of a unique combination of softness of ride and stability under dynamic service conditions.

It is still another object of the present invention to provide a radial tire featuring radially disposed cords comprising a multiplicity of gathered-together glass filaments in combination with belt plies featuring mutually parallel glass cords, each comprising a multiplicity of glass filaments; the cords being angularly disposed and additionally featuring a combination of reinforcement members featuring a content of chopped lengths of glass.

It is yet another object of the present invention to provide an all glass radial tire which is readily capable of being manufactured utilizing the conventional two-stage operation used in the manufacture of radial tires.

It is still another object of the present invention to provide a tire possessed of such features of construction and which utilizes unvulcanized tire building components as may conveniently in many cases allow manufacture on conventional flat band equipment.

It has been discovered that tires featuring glass as substantially the sole reinforcement, when properly constructed in accordance with the precepts of the present invention, demonstrate an extremely soft, non-harsh, comfortable ride while at the same time imparting to the vehicle bearing same improved stability and, of course, therefore embodying safety of operation and improved wear.

In accordance with the present invention, the glass reinforcement is present in the tire both in the form of continuous cord reinforcement and in the form of chopped lengths of glass; the continuous cords being located in radial disposition in the carcass, in inclined or bias disposition in certain tread reinforcing belt plies and the chopped lengths, being contained in members preselectively located as a carcass cushion ply and as a tread cushion ply, preferably in mutually abutting relationship in a manner as will be more particularly described hereinafter.

The foregoing as well as other objects of the present invention will become apparent to those skilled in the art from the following detailed description taken in conjunction with the annexed sheet of drawings on which there is presented, for purposes of illustration only, a single embodiment of the tire construction of the present invention.

IN THE DRAWINGS

The FIGURE is a three-quarter perspective view, portions of which have been sectioned in order to show the interior cord reinforcement and other novel features of construction.

Viewed in its simplest embodiment, the present invention envisions a tire construction comprising a carcass featuring a plurality of side-by-side, radially disposed glass cords in combination with one or more belt plies featuring bias inclined glass reinforcing cords in combination with a chopped glass containing squeegee ply situated beneath the carcass ply in the tread region, that is, from shoulder to shoulder, and also in combination with an underlying chopped glass containing liner ply extending from bead to bead. Preferably, the liner ply should at least partially encircle the bead and lie in surface abutment with the carcass ply in the sidewall regions and in underlying surface abutment with the tread squeegee ply in the crown region; that is, the region extending from shoulder to shoulder of the tire as viewed in section.

In accordance with a preferred embodiment of the present invention, the amount of chopped glass in the tread reinforcing squeegee ply and in the carcass liner ply is preselectively controlled to measure from about 3 to about 10 parts per hundred of rubber. In percent by weight of rubber compound, the numerical value will usually be less than this, considering the other additions and content of the usual rubber stock formulation or recipe.

Reference may now be had to the single sheet of drawings on which there is illustrated a tire 11 embodying features of construction in accordance with the present invention. As can be seen, the tire includes a pair of spaced beads 13 and 14 connected by a carcass 15 which defines a torus in extending from bead 13 to bead 14. The carcass includes opposed sidewall regions 16, a crown region 17 and shoulder regions 18 on either side of the crown region 17; the latter marking the site of the outer peripheral ground-contacting tread identified by the reference numeral 20. Situated in the crown region of the tire and extending generally laterally from shoulder to shoulder but at the same time peripherally about the tire, beneath the tread and between the tread and the carcass are a pair of tread reinforcing belts 22 and 24; the belt 22 being somewhat wider and beneath the belt 24. The belt plies 22 and 24 are each composed of parallel cords, respectively identified by the reference numerals 22a and 24a, which extend in mutually parallel array at an inclined angle to the peripheral centerline of the tire which is generally coincident with the centermost tread groove 20a. The mutually parallel cords 22a and the cords 24a are each embedded in an elastomeric matrix which is ultimately compatible with the rubber stock of the tire proper. The cords 22a and 24a are each composed of a multiplicity of continuous glass filaments gathered together in assembled array in a manner to be described hereinafter. The principal carcass ply 26 is composed of a plurality of glass cords 26a which are located in side-by-side, mutually parallel array extending normal to the peripheral centerline and extending from the bead turnup region 26b on the left to the bead turnup region 26c on the right. The glass cords 26a are likewise formed of a multiplicity of continuous glass filaments gathered together in assembled array. Beneath the carcass ply in the crown region is situated a tread-supporting squeegee or cushion ply 30. The squeegee ply 30 extends peripherally about the tire and extends laterally from one lateral edge 30a which, as can be seen, is well into the shoulder region to lateral edge 30b which is located in the opposite shoulder sidewall region. The squeegee ply 30 contains a plurality of short lengths of glass identified by the reference numeral 30c. Situated beneath the squeegee ply 30 and in abutting surface contact therewith and, as well, in abutting surface contact with the underside of the principal carcass ply 26 is a liner ply 32 which extends from bead to bead and is, in fact, in at least partial encirclement of the beads; the latter each being composed of a multiplicity of continuous parallel cord members.

The liner ply in the bead turnup region is identified by the reference numeral 32c. The bead encircling and underlying liner ply 32 contains a plurality of relatively short lengths of glass identified by the reference numeral 32d. From the illustration and the foregoing description, it can be seen that the squeegee ply 30 is located between the carcass ply 26 and the liner ply 32. On the inside of the liner ply 32 is an abutting inner ply 36 of gum stock which extends from bead to bead and serves to provide the smooth inner surface of the tire.

The radially disposed cords 26a have been described as defining an angle normal to the peripheral centerline. It will be appreciated that the angle, in fact, may range from about 87° on the one side to about 87° on the other, providing as much as about 6° variation that may be found to occur in the actual tires constructed to incorporate the features of construction as described hereinabove. The cords 22a and 24a preferably describe an angle with the peripheral centerline which ranges from about 15° to 30°; the cords 22a of belt 22 defining an angle which is equal to but opposite to the angle of cords 24a of belt 24.

In accordance with a preferred embodiment, the glass cords 22a, 24a and 26a are each composed of three 2,000 filament strands combined with essentially no twist. The cords in parallel array define a spacing of approximately 16 cord ends per inch.

The glass employed in the cords in the belt plies, the carcass and, as well, the undertread squeegee ply and inner liner is initially formed by drawing the glass in the form of filaments from a molten compounded batch supply thereof melted in an electrically heated multi-orifice platinum bushing. The platinum bushing containing the molten supply of glass has in its bottom wall a plurality of usually 204 or 400, in some cases in the neighborhood of 900 and even 2,000, holes or apertures through which the molten glass flows and is drawn or attenuated at extremely rapid speeds by a revolving winder situated therebeneath and at some distance below the bushing. As the filaments are attenuated to extremely fine diameter, they are sprayed with a size composition, preferably containing an anchoring agent adapted to impart to the glass surface the ability to become adhered to or assimilated in the rubber stock or an elastomeric impregnant. The latter is more commonly employed as a bath through which multifilament strands, yarns and/or cords are passed for coating pickup and impregnation of the spaces between the filaments. Generally, the initially drawn array of filaments are drawn together into strand array as a gathering of filaments, frequently with a certain amount of twist; the surface size frequently serving as a binder, lending strand integrity. As the filaments are attenuated, they become cooled and solidified as they are wound onto the winder spool. Usually, a strand composed of a multiplicity of drawn and attenuated filaments is combined with additional similar and/or identical strands to form multiple-strand yarns which are in turn combined with like yarns to form cords or what may be described as bundles.

As previously indicated, the glass filaments as they are attenuatingly drawn from the bushing cool and become solid. During this operation and just prior to winding onto the spool, the glass filaments are preferably coated with a suitable surface size. One or a variety of sizes are based on the amino silanes. A number of formulations for amino silanes are disclosed in U.S. Pat. No. 3,391,052; which patent is assigned to the same assignee as the present application. One of the formulations for a size is as follows:

0.5 – 2.0 percent by weight gamma-aminopropyltriethoxy silane
0.1 – 0.5 percent by weight cationic lubricant Remainder water The cationic lubricant may be an amino polyester or a cationic softener such as glycerine. The sized filaments as indicated, when wound onto supply spools as strands or following this, are combined with like strands or yarns to form multi-filament bundles or cords. Twist may or may not be employed in the various plying and combining operations. Most ideally, the cord is in a balanced condition which is ideally represented by a structure which is relatively free of twist or having a relatively small amount of twist.

The glass in the form of strands, yarns and, most usually, in cord form is further desirably impregnated with an elastomeric impregnant. This serves the purpose of protecting the filaments against surface contact with like adjacent or contiguous filaments as might otherwise lead to breaking and deterioration and also to assist in the assimilation of the glass filament cord into the ultimate rubber body or matrix of which the ultimate tire is composed. The glass filaments in the form of strands, yarns or cords are immersed in a suitable impregnant bath to coat the strand, yarn or cord and also to achieve penetration of the liquid elastomeric impregnant into the interstitial spaces between adjacent contiguous filaments along the length of the continuous strand, yarn or cord.

A suitable bath, by way of example, is composed of 60 – 40 parts by weight of a 38 percent dispersed solids system including a butadiene-styrene-vinyl pyridine terpolymer latex, a butadiene styrene latex and a resorcinol-formaldehyde resin; said solids being dispersed in 40 parts by weight of water. A generally usable commercial product is marketed under the trade name "LOTOL-5440" by Uniroyal (formerly United States Rubber Company).

The squeegee ply and the liner ply, both of which contain chopped lengths of glass, can be prepared by calendering or mill mix of the appropriate rubber stock selected, of course, in terms of compatibility with the elastomeric rubber stock of which the tire is composed. A mill mix of glass containing stock is prepared by adding lengths of glass usually in yarn or cord form and preferably impregnated in a manner herein earlier described to an amount of rubber carried on one of the rollers of a two-roll mill. The glass as added in cord form preferably ranges in size from about ¼ inch in length to several inches in length. As the lengths of glass are worked into the stock, the lengths become shorter by reason of the physical work and action performed on the stock and the lengths. Also, the strands and/or cords experience separation into subelement form, usually into filaments. This again is due to the considerable shear exerted on the stock and, as well, the glass contained therein as it passes the shear or work zone on the mill. Generally, the glass is added in small amounts rather than all at once; the incremental addition of the glass serving to assist in its being efficiently worked into the glass. Milling is continued, coupled with repeated cutting and working of the stock by the mill operator until the glass is intimately and generally homogeneously diffused through the mass. The longer the material is kept on the mill, the more orientation of the lengths in the direction of movement of stock will be observed and achieved. When the milling has been completed, care being taken not to overwork or scorch the stock, the material is sheeted off and employed in the fabrication of the squeegee ply or the liner reinforcing ply. The milled stock can be further milled to appropriate thickness and thereafter cut to desired dimension. At the same time, the cutting can be on the bias to provide the cut lengths in the sheet material in a manner as will provide a particular angular disposition of the majority of lengths. Most preferably in accordance with the present invention, the alignment of the cut lengths in both the tread cushioning squeegee ply and the underlying liner ply is circumferential. Glass in the squeegee ply and the liner ply is desirably maintained at about the 5 percent level, although as little as about 2 percent will provide some improvement in properties, while as much as 10 to 15 percent of the glass may be used. Amounts in excess of this do not provide any marked increase and in this particular application may, in fact, be undesirable.

A number of tires were built, employing the features of construction as described herein. The cords of the single-ply carcass and the cords in the two tread reinforcing belts were glass cords. The carcass cords, of course, were disposed at 90° to the peripheral centerline, while the cords in the two belt plies were situated at 21½° (measured in the cured state); with the cords in one ply inclined oppositely to the cords in the other. The tire additionally featured a liner ply 32 and a squeegee ply in the crown region; both of which containing glass at a 5 percent level. The squeegee or cushion ply in the test tires had a calendered thickness of about 0.030 inches. The carcass reinforcing liner ply measured a thickness of 0.045 inches. The tire was built in two steps in the conventional radial tire manufacturing technique. Thus, the carcass and beads were assembled on a drum, following which the assembly was expanded into approximately torus configuration, whereupon the belts and the tread stock were applied and the tire was then cured.

A plurality of GR 70 × 15 tires were fabricated and tested at 26 psi inflation on a 1970 Pontiac Lemans two-door V-8 four-passenger automobile. Similar tires were built for comparison purposes; the comparison or control tires featuring in one case a rayon carcass with wire cord belts and in the other case a rayon cord carcass and rayon cord belts. The tires were graded by passengers, having in mind ride comfort, handling and noise. In the ride segment of the test, the car and particularly the tires were subjected to light impacts and heavy impacts at low speed and high speed. Harshness was a special criteria. In all ratings, the tire featuring all glass reinforcement and the particular construction features of the present invention were at least equal to and in most cases superior to the control tires featuring rayon carcass with rayon belts or rayon carcass and wire belts.

In handling, which was inclusive of stability, steering response, lane change and recovery qualities, the tire of the invention was equal to or superior to the control tire and in most cases superior.

In noise level having as criteria "boom," "seam slap" and "cornering squeal," the tires of the invention rated as better than either of the controls.

While it is not known with certainty, it is believed that the glass in the liner ply and the glass in the tread region squeegee ply imparts an increased modulus to the stock and enables them to perform a supportive yet cushioning function in critical regions. At the same time, of course, while the presence of the glass increases modulus and perhaps enhances the stability of the tire, considered as a rolling torus, it is nonetheless found that the stock containing the glass remains relatively uneffected in terms of resilience and what may be termed "bounce" or "nerve," particularly as compared to stock containing organic reinforcement. These latter properties contribute to the shock absorbing ability and character of the rubber. In any event, it is known that the tires embodying the features of construction in accordance with the present invention do exhibit a unique combination of increased handling stability; this property being generally attributed to the harsher radial structure and at the same time a softer, less harsh ride as normally attributed to bias tires.

The carcass ply 26 featuring radially disposed glass cord is desirably produced by a continuous calendering of stock onto a parallel array of glass cords drawn from a supply source and disposed in horizontal array such as to provide a cord spacing of about 16 cord ends per inch. As indicated previously, each cord is formed by plying together three strands, each composed of 2,000 filaments.

A cord spacing of 16 ends per inch has been likewise found suitable for the glass cords contained in the belt plies 22 and 24, particularly where the two-step technique is employed in the building of the radial tires embodying the features of construction in accordance with the present invention. Under certain circumstances, the one-step or flat band technique may be employed; in which case, the cord spacing for the belts is preferably decreased to somewhere in the vicinity of 8 to 12 cord ends per inch. At the same time, in the flat band building, the cords of the belts or, alternatively, the belt plies are bias cut from calendered stock material in such manner as to provide a green angle of the cords in the range of 45° to 60°. The larger green angle permits the cords in the belt plies to shift or pantograph during the combination expansion and cure as carried out in the usual production vulcanization of tires built by the flat band method.

The unique combination of handling stability most usually observed by the driver/user and the comfort or lack of harshness usually observed by all occupants of the vehicle is believed effected by a combination of features embodied in the tire in accordance with the present invention. These features are (1) the use of essentially all glass reinforcement, particularly in the formation of the carcass cords, the formation of the belt ply cords and the production of the liner ply and squeegee or cushion ply, (2) the employment of a relatively high modulus, glass-containing liner ply on the inner side of the principal radial cord carcass ply and extending from bead to bead and (3) the employment of a squeegee ply situated between the glass-containing liner ply and the conventional radial cord carcass ply in the tread or crown region and extending (as viewed in section) from one shoulder region to the other shoulder region of the tire. It is suspected, although not proven, that the advantage of glass cord as a carcass member and particularly as a radial reinforcing cord in a carcass and the advantage of glass as a cord in a belt ply in enhanced by the liner ply and the squeegee ply containing relatively inert glass lengths.

The employment of the glass containing liner ply and/or the squeegee ply provides a dual functional advantage, namely, (1) resisting the tendency for the carcass cords to pull through the carcass, particularly in the shoulder region, as induced by expansion of the cylindrical carcass preform into ultimate torus configuration and (2) reinforcing the carcass across the shouldercrown-shoulder region, which region experiences carcass cord separation between adjacent cords due to enlargement of the region in the expansion of the preform into torus configuration.

It will be appreciated that variations and modifications as to the constructional features described herein may be made where obviously within the purview of the teachings and disclosures set forth hereinabove. Accordingly, all such obvious equivalents and substitutions are intended to be included within the scope of the present invention unless such would be violative of the express language of the appended claims.

I claim:

1. In a tire construction composed of (1) a pair of spaced beads, (2) a connecting carcass of generally radially disposed vitreous cords, embedded in an elastomeric matrix layer, extending toroidally from bead to bead and at least partially encircling said beads, (3) a ground contacting tread carried at the crown of said carcass and (4) at least two tread reinforcing belts located between said carcass and said tread and extending circumferentially about said tire, said belts each including a plurality of mutually parallel vitreous cords, said tire including shoulder regions on either side of the tread, the improvement which includes:

a first layer of elastomeric stock on the inner side of said carcass and extending from one shoulder region to the other, said layer including a plurality of short lengths of glass, a second layer of elastomeric stock on the inner side of said first layer and said carcass, said second layer extending toroidally from bead to bead, said second layer containing a plurality of short lengths of glass, and a third layer of elastomeric stock on the inner side of said second layer and substantially coextensive therewith, said third layer containing essentially no glass.

2. The tire construction as claimed in claim 1, wherein said lengths of glass in said first layer are appreciably mutually oriented.

3. The tire construction as claimed in claim 1, wherein said lengths of glass in said second layer are appreciably mutually oriented.

4. The tire construction as claimed in claim 2, wherein said lengths of glass in said second layer are appreciably mutually oriented.

5. The tire construction as claimed in claim 2, wherein said orientation is majorly parallel with the peripheral centerline of said tire.

6. The tire construction as claimed in claim 4, wherein said orientation is majorly parallel with the peripheral centerline of said tire.

7. The tire construction as claimed in claim 4, wherein the orientation of lengths in said two layers differs.

8. In a tire construction comprising (1) a pair of spaced beads, (2) a connecting carcass of generally radially disposed vitreous cords embedded in an elastomeric matrix layer extending toroidally from bead to bead and at least partially encircling said beads, (3) a ground contacting tread carried at the crown of said carcass, (4) at least two tread reinforcing belts located between said carcass and said tread and extending circumferentially about said tire, said belts each including a plurality of side-by-side vitreous cords, said tire including shoulder regions on either side of the tread; the improvement which includes:

1. a tread cushion ply extending circumferentially in surface abutment with the inner side of said carcass ply and having lateral edges in the shoulder regions of said tire, said tread cushion ply comprising an elastomeric matrix having distributed therethrough a plurality of short lengths of glass in an amount ranging from about 3 to about 10 parts per hundred of rubber, 2. an essentially continuous carcass liner ply of elastomeric stock in surface abutment with the inner side of said tread cushion ply and said carcass, said carcass liner ply extending from bead to bead, said carcass liner ply containing a plurality of short lengths of glass, and 3. a gum stock inner liner ply on the inner side and coextensive with said carcass liner ply.

9. In a tire construction composed of (1) a pair of spaced beads, (2) a connecting carcass of generally radially disposed cords, embedded in an elastomeric matrix layer, extending toroidally from bead to bead and at least partially encircling said beads, (3) a ground contacting tread carried at the crown of said carcass and (4) at least two tread reinforcing belts located between said carcass and said tread and extending circumferentially about said tire, said belts each including a plurality of mutually parallel vitreous cords, said tire including shoulder regions on either side of the tread; the improvement which includes:

a first layer of elastomeric stock on the inner side of said carcass, said layer including a plurality of short lengths of glass, and a second layer of elastomeric stock on the inner side of said first layer and said carcass, said second layer extending toroidally from bead to bead, said second layer containing a plurality of short lengths of glass.

10. The tire construction as claimed in claim 9, wherein said lengths of glass in said first layer are appreciably mutually oriented.

11. The tire construction as claimed in claim 10, wherein said layer extends toroidally from bead to bead.

12. The tire construction as claimed in claim 11, wherein said lengths of glass in said layer are substantially mutually oriented.

13. The tire construction as claimed in claim 12, wherein said orientation is majorly parallel with the peripheral centerline of said tire.

14. The tire construction as claimed in claim 10, wherein said layer extends generally across the crown from one shoulder region to the other.

15. The tire construction as claimed in claim 9, wherein the improvement further includes a third layer of elastomeric stock on the inner side of said second layer and substantially coextensive therewith, said third layer containing essentially no glass.

16. In a tire construction composed of (1) a pair of spaced beads, (2) a connecting carcass of generally radially disposed cords, embedded in an elastomeric matrix layer, extending toroidally from bead to bead and at least partially encircling said beads, (3) a ground contacting tread carried at the crown of said carcass and (4) at least two tread reinforcing belts located between said carcass and said tread and extending circumferentially about said tire, said belts each including a plurality of mutually parallel vitreous cords, said tire including shoulder regions on either side of the tread; the improvement which includes:

a first layer of elastomeric stock on the inner side of said carcass, said layer extending generally across the crown from one shoulder region to the other and including a plurality of short lengths of glass, and a second layer of elastomeric stock on the inner side of said first layer and said carcass, said second layer extending toroidally from bead to bead, said second layer containing a plurality of short lengths of glass.

17. The tire construction as claimed in claim 16, wherein said improvement includes a third layer of elastomeric stock on the inner side of said second layer and substantially coextensive therewith, said third layer containing essentially no glass.

18. The tire construction as claimed in claim 16, wherein said lengths of glass in said first layer are appreciably mutually oriented.

19. The tire construction as claimed in claim 18, wherein said lengths of glass in said second layer are appreciably mutually oriented.

20. The tire construction as claimed in claim 19, wherein the orientation of lengths in said two layers differ.

21. The tire construction as claimed in claim 16, wherein the improvement further includes a third layer of elastomeric stock on the inner side of said second layer substantially coextensive therewith, said third layer containing essentially no glass.

* * * * *